United States Patent
Misawa

(10) Patent No.: US 8,077,244 B2
(45) Date of Patent: Dec. 13, 2011

(54) CAMERA HAVING OPENABLE AND CLOSABLE MONITORS

(75) Inventor: Atsushi Misawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1377 days.

(21) Appl. No.: 11/634,881

(22) Filed: Dec. 7, 2006

(65) Prior Publication Data

US 2007/0126910 A1   Jun. 7, 2007

(30) Foreign Application Priority Data

Dec. 7, 2005  (JP) .................................. 2005-353585

(51) Int. Cl.
*H04N 5/222* (2006.01)
*H04N 5/225* (2006.01)
*G09G 5/00* (2006.01)

(52) U.S. Cl. .............. 348/333.06; 348/333.01; 348/373; 345/1.1; 345/1.3; 345/5

(58) Field of Classification Search ............ 348/333.01–333.13; 345/1.1, 1.3, 5
See application file for complete search history.

(56) References Cited

U.S. PATENT DOCUMENTS

| | | | | |
|---|---|---|---|---|
| 6,297,945 B1 * | 10/2001 | Yamamoto | | 361/679.04 |
| 6,393,222 B1 | 5/2002 | Nakagawa et al. | | |
| 6,577,496 B1 | 6/2003 | Gioscia et al. | | |
| 6,812,907 B1 * | 11/2004 | Gennetten et al. | | 345/1.3 |
| 7,355,338 B2 * | 4/2008 | Osame et al. | | 313/503 |
| 7,394,495 B2 * | 7/2008 | Maniwa | | 348/333.11 |
| 2002/0063518 A1 * | 5/2002 | Okamoto et al. | | 313/506 |
| 2004/0075620 A1 * | 4/2004 | Tanaka et al. | | 345/1.1 |
| 2004/0252220 A1 * | 12/2004 | Oda et al. | | 348/333.06 |
| 2005/0040753 A1 * | 2/2005 | Osame et al. | | 313/500 |
| 2005/0174458 A1 * | 8/2005 | Maniwa | | 348/333.01 |
| 2005/0270396 A1 * | 12/2005 | Miyashita et al. | | 348/333.01 |
| 2006/0082518 A1 * | 4/2006 | Ram | | 345/1.1 |
| 2006/0256033 A1 * | 11/2006 | Chan et al. | | 345/1.1 |
| 2007/0013608 A1 * | 1/2007 | Goo et al. | | 345/1.1 |
| 2007/0024524 A1 * | 2/2007 | Lai | | 345/1.1 |
| 2007/0103382 A1 * | 5/2007 | Chang et al. | | 345/1.1 |
| 2007/0120762 A1 * | 5/2007 | O'Gorman | | 345/1.1 |

FOREIGN PATENT DOCUMENTS

| | | |
|---|---|---|
| JP | 3-58578 A | 3/1991 |
| JP | 3-102979 A | 4/1991 |
| JP | 3-291065 A | 12/1991 |
| JP | 8-98071 | 4/1996 |
| JP | 8248895 | 9/1996 |

(Continued)

OTHER PUBLICATIONS

Japanese Written Opinion on JP2005-353585 ; Mar. 30, 2010; with English translation.

(Continued)

*Primary Examiner* — Sinh Tran
*Assistant Examiner* — Christopher K Peterson
(74) *Attorney, Agent, or Firm* — Sughrue Mion, PLLC

(57) ABSTRACT

A camera, including a camera main body; a first monitor which is openable and closable on the camera main body; and a second monitor which is openable and closable on the camera main body; wherein the first monitor and the second monitor are configured so that the second monitor is closed when the first monitor is opened, and the first monitor is closed when the second monitor is opened.

4 Claims, 5 Drawing Sheets

FOREIGN PATENT DOCUMENTS

| | | |
|---|---|---|
| JP | 2645306 | 5/1997 |
| JP | 10207389 | 8/1998 |
| JP | 10-319490 A | 12/1998 |
| JP | 11007259 A | 1/1999 |
| JP | 11249596 A | 9/1999 |
| JP | 11-298773 A | 10/1999 |
| JP | 11289484 | 10/1999 |
| JP | 11341121 A | 12/1999 |
| JP | 200010086 A | 1/2000 |
| JP | 2001-197344 A | 7/2001 |
| JP | 2001-350428 | 12/2001 |
| JP | 2003-153065 A | 5/2003 |
| JP | 200423581 A | 1/2004 |
| JP | 2004-109382 | 4/2004 |
| JP | 2004109382 A | 4/2004 |
| JP | 2004198472 A | 7/2004 |
| JP | 2005-10410 | 1/2005 |
| JP | 2005-12459 | 1/2005 |
| JP | 2005-051531 A | 2/2005 |
| JP | 2005086283 A | 3/2005 |
| JP | 2005134502 A | 5/2005 |
| WO | 9934348 A1 | 7/1999 |

OTHER PUBLICATIONS

Japanese Patent Office, "Notice of Reasons for Rejection," issued in connection with Japanese Patent Application No. 2005-353585, dated Jun. 14, 2010 (11 pages), English Translation.

Notice of Reasons for Rejection, dated Dec. 2, 2010 corresponding to JP 2005-353585, English Translation.

Japanese Office Action JP 2005-353585, issued Feb. 23, 2011, English language.

* cited by examiner

CAMERA HAVING OPENABLE AND CLOSABLE MONITORS

BACKGROUND OF THE INVENTION

1. Field of the Invention

The present invention relates to a camera, and more particularly, to a digital camera equipped with a large-screen display section and suitable for photographing and playback of images.

2. Description of the Related Art

In digital cameras provided with display sections such as liquid crystal monitors, the increase in size of display sections has created conflicting issues of improvement in gripability of such digital cameras and downsizing of the camera main bodies. In other words, in a digital camera equipped with a large-screen display section, only a grip portion of the camera main body must be enlarged in order to enhance gripability. Additionally, in light of the increased size in display screens, various innovations have been made on digital cameras in order to protect their display screens from scratches or stains. For instance, a digital camera with a built-in cover member for protecting a display screen is disclosed in Japanese Patent Application Laid-Open No. 11-298773.

In this digital camera, a cover member is provided on the camera main body so as to be slidable. When the camera is not in use, the cover member is pushed back into the camera main body to be housed therein, and moves to a position which partially or entirely covers the display screen to provide protection thereof. In addition, by pulling out the cover member from the camera main body when using the camera, the entire display screen becomes exposed, and at the same time, the cover member moves to the side of the camera main body to be used as a grip portion, thereby enhancing gripability. Furthermore, the disclosure of Japanese Patent Application Laid-Open No. 11-298773 includes a playback mode for reading out image data stored in a storage section to display the images on a liquid crystal monitor.

However, since the digital camera disclosed in Japanese Patent Application Laid-Open No. 11-298773 is provided with a fixed grip section on the camera main body on which a large-screen display section is mounted, the camera has a disadvantage in that only the grip section of the camera increases in size when carrying the camera. Additionally, since a space for housing the cover member is formed in the grip section of the camera described in Japanese Patent Application Laid-Open No. 11-298773, a problem exists in which the grip section increases in size, necessitating increasing in size of the camera.

SUMMARY OF THE INVENTION

The present invention was made in consideration of such circumstances, and its object is to provide a camera which ensures operability and gripability during photographing, achieves downsizing during image playback and when carried, and in addition achieves enlargement of the screen during image playback.

In order to achieve the above-described objects, the invention according to a first aspect is characterized in that a first monitor and a second monitor which are openable and closeable are provided on a camera main body, and in that the first monitor and the second monitor are configured so that the second monitor is closed when the first monitor is opened, and the first monitor is closed when the second monitor is opened.

The invention according to a second aspect is the invention according to the first aspect, characterized in that the first monitor is an image playback monitor, while the second monitor is a finder monitor.

The invention according to a third aspect is the invention according to the first or second aspect, characterized in that the first monitor is configured to be roughly the same size as a rear face of the camera main body when the first monitor is opened, and the second monitor is configured to be smaller than the first monitor.

According to the first aspect, the first monitor and the second monitor are provided on the camera main body so as to be openable and closeable, and according to the second aspect, playback images are displayed on the first monitor by opening the first monitor during playback. At this point, since the second monitor is closed, the second monitor is protected by the camera main body. By opening the second monitor during photographing, the second monitor functions as an electronic view finder and displays subject images. At this point, since the first monitor is closed, the first monitor is protected by the camera main body.

In addition, as described in the third aspect, by configuring the first monitor to be roughly the same size as a rear face of the camera main body, enlargement of the screen during image playback may be achieved, and by configuring the second monitor to be smaller than the first monitor, a portion of the camera main body that is located to the side of the second monitor may be used as a grip section. This enables improvement of operability and gripability during photographing. Furthermore, while the camera of the present invention may be carried either in a state in which the first monitor is opened or in a state in which the second monitor is opened, since the size of the camera at this point will not become larger than the camera main body, portability is improved in comparison to a camera in which a grip section is separately formed on a camera main body.

In order to achieve the above-described objects, the invention according to a fourth aspect is characterized by comprising: a camera main body; a folding section provided on the camera main body so as to be foldable; a first monitor provided on the folding section; and a second monitor provided on the folding section.

The invention according to a fifth aspect is the invention according to the fourth aspect, characterized in that the first monitor and the second monitor are provided on the folding section at positions which enable the first monitor to be exposed when the folding section is unfolded and the second monitor to be exposed when the folding section is folded.

The invention according to a sixth aspect is the invention according to the fourth or fifth aspect, characterized in that the camera mode is switched to an image playback mode when the folding section is unfolded and image playback is performed on the first monitor, while the camera mode is switched to a photographing mode when the folding section is folded and a subject image is displayed on the second monitor.

The invention according to a seventh aspect is the invention according to the fourth, fifth or sixth aspect, characterized in that the first monitor is configured to be roughly the same size as a rear face of the camera main body when the folding section is unfolded, and the second monitor is configured to be smaller than the first monitor.

The invention according to an eighth aspect is the invention according to the fourth, fifth, sixth or seventh aspect, characterized in that operation devices related to photographing are provided at a portion of the camera main body which is exposed when the folding section is folded.

According to the fourth aspect, the first monitor and the second monitor are provided on the folding section provided on the camera main body so as to be foldable, and according to the fifth aspect, the first monitor is exposed when the folding section is unfolded and the second monitor is exposed when the folding section is folded. In addition, according to the sixth aspect, the camera mode is switched to an image playback mode when the folding section is unfolded and image playback is performed on the first monitor, while the camera mode is switched to a photographing mode when the folding section is folded and a subject image is displayed on the second monitor.

Furthermore, according to the seventh aspect, enlargement of the screen during image playback may be achieved by configuring the first monitor to be roughly the same size as a rear face of the camera main body, and a portion of the camera main body that is located to the side of the second monitor may be used as a grip section by configuring the second monitor to be smaller than the first monitor. Thus, improvement of gripability during photographing is achieved.

Moreover, according to the eighth aspect, since operation devices related to photographing are provided at a portion of the camera main body which is exposed when the folding section is folded, or, in other words, at a portion of the camera main body which is located to the side of the second monitor, improvement of operability of the camera during photographing is achieved. Furthermore, while the camera may be carried either in a state in which the first monitor is opened or in a state in which the second monitor is opened, since the size of the camera at this point will not become larger than the camera main body, portability is improved in comparison to a camera in which a grip section is separately formed on a camera main body.

The camera according to the present invention ensures operability and gripability during photographing, achieves downsizing during image playback and when carried, and in addition achieves enlargement of the screen during image playback.

DETAILED DESCRIPTION OF THE PREFERRED EMBODIMENTS

Preferred embodiments of a camera according to the present invention will now be described with reference to the attached drawings.

Figure 1:
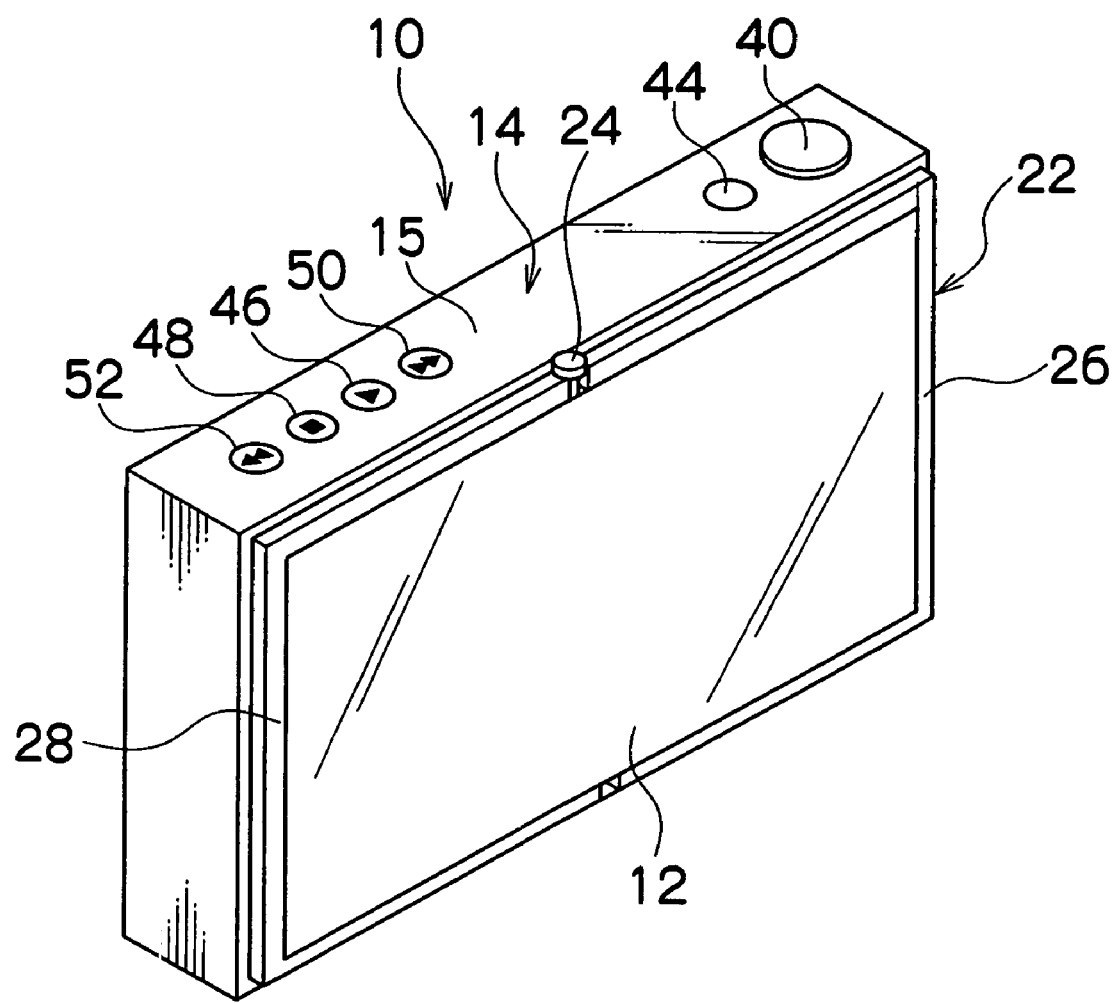
FIG. 1 is a rear perspective view of a digital camera according to a first embodiment during an image playback mode.
Figure 2:
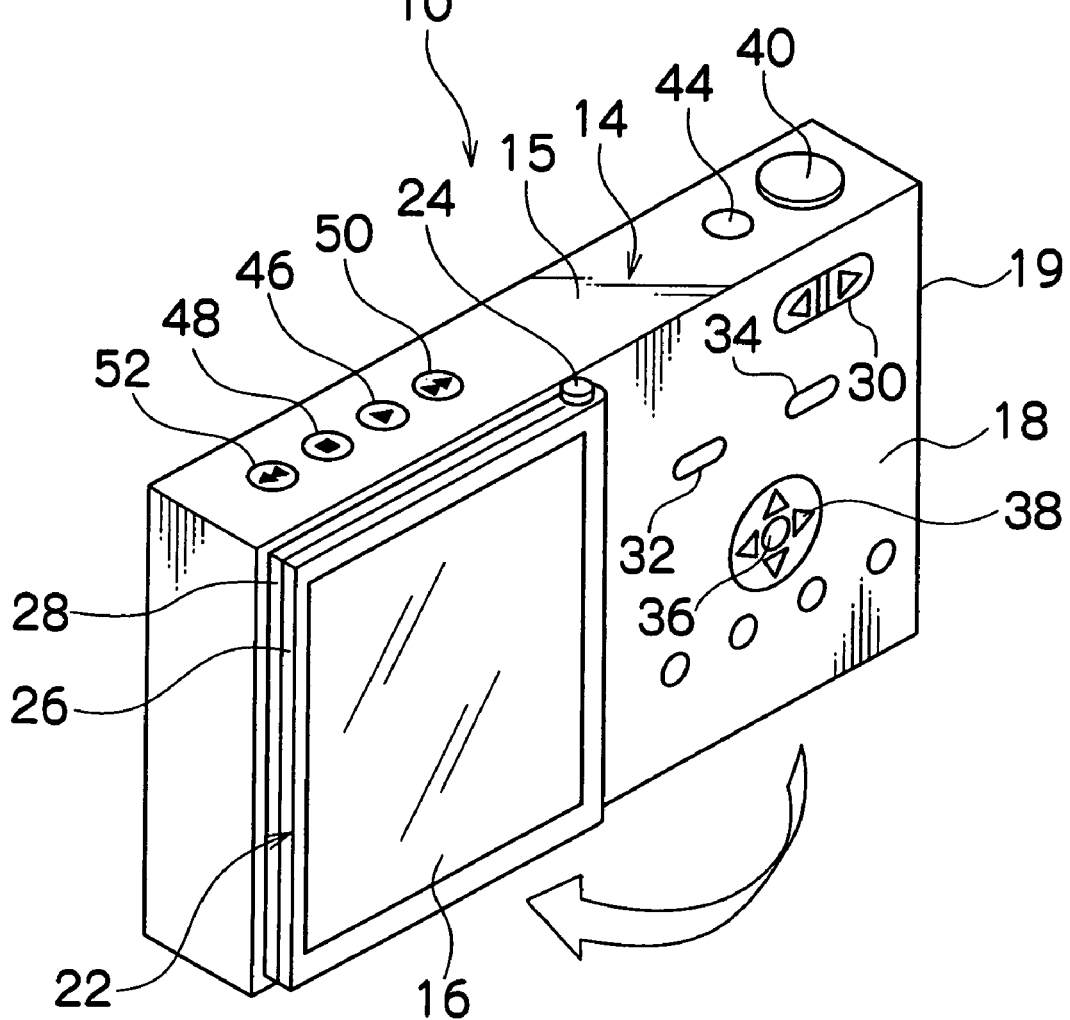
FIG. 2 is a rear perspective view of the digital camera according to the first embodiment during a photographing mode.
Figure 3:
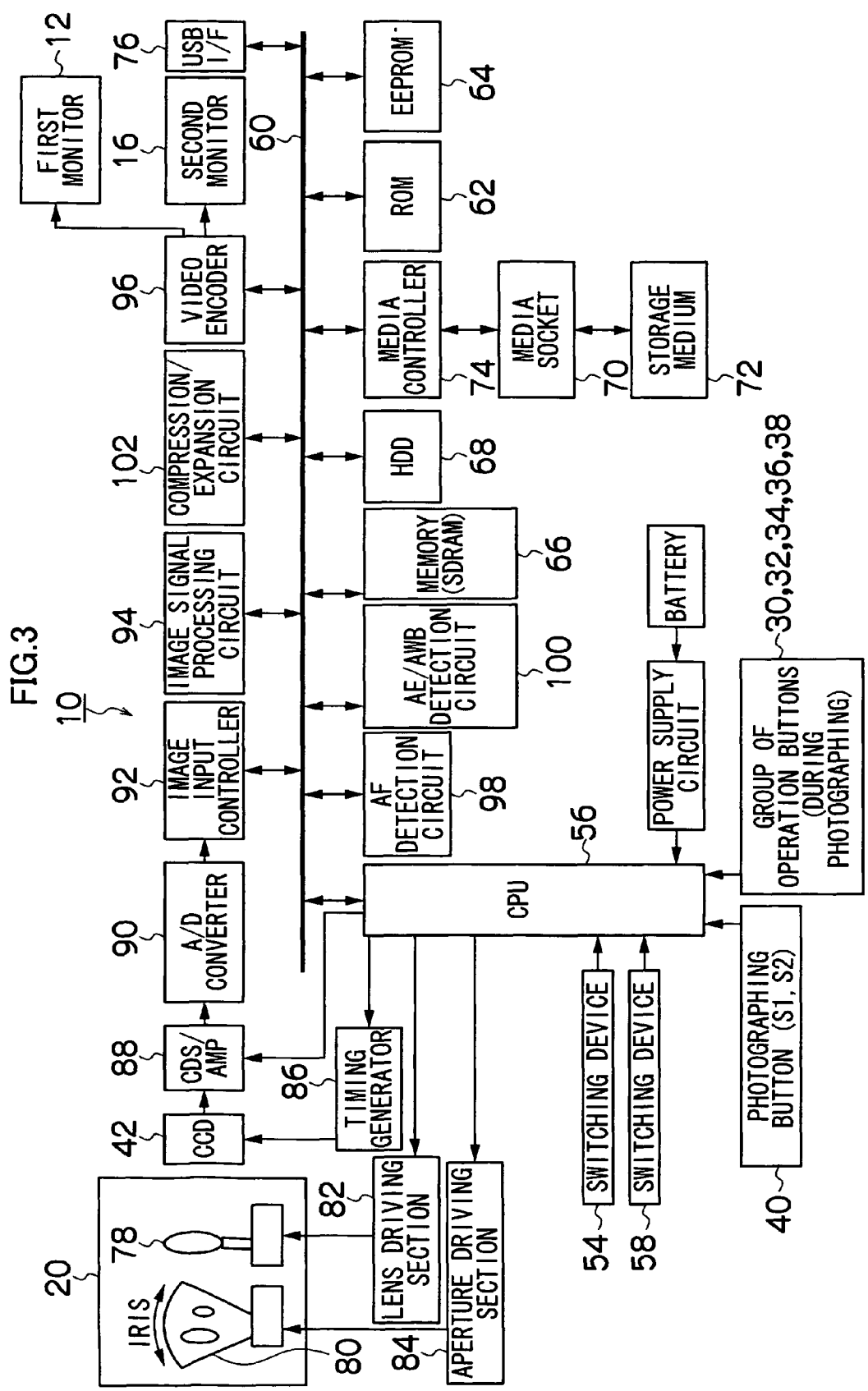
FIG. 3 is a block diagram showing an overall configuration of the digital camera shown in FIG. 1.

FIG. 1 is a rear perspective view of a camera main body 14 in a state in which a first monitor 12 is opened, in a digital camera 10 according to a first embodiment. FIG. 2 is a rear perspective view of the camera main body 14 in a state in which the first monitor 12 is closed and a second monitor 16 is opened. In addition, FIG. 2 shows that a right-side flat section (a portion of the camera main body located to the side of the second monitor) 18 on the rear face of the camera main body 14 which is exposed when the second monitor 16 is opened, and a right-side section 19 of the camera main body 14 are used as a grip section to be held by the right hand of a user. FIG. 3 is a block diagram showing an overall configuration of the digital camera 10.

Although not shown in FIGS. 1 and 2, a photographic lens unit 20 (refer to FIG. 3) and a strobe section equipped with a xenon tube are provided at predetermined positions on the front face side of the camera main body 14.

The main body 14 of the digital camera 10 has an exterior appearance of an approximate cuboid that is flattened in the direction of thickness, and has a horizontally long shape that is long in the direction of width in relation to the length of the main body 14 in its direction of height.

The first monitor 12 shown in FIG. 1 is a screen with an aspect ratio of 9:16, and the size of the mounted screen is arranged to be as large as possible in relation to the rear face of the camera main body 14 in the opened state shown in FIG. 1. The first monitor 12 is provided in a tensioned state on a frame-like folding section 22 fixed on the camera main body 14. In addition, since the folding section 22 is folded around a hinge shaft 24 located at a central position thereof so that a right-side C-shaped frame 26 folds towards a left-side C-shaped frame 28 as shown in FIG. 2, the first monitor 12 is configured of a flexible display body such as an organic EL or an inorganic EL. Since the first monitor 12 is used as a large-screen monitor during image playback, the first monitor 12 is preferably configured of a high-definition display body. In addition, the folding section 22 is attached to the camera main body 14 by fixing the left-side C-shaped frame 28 to the camera main body 14.

The second monitor 16 is provided on a rear face side of the C-shaped frame 26. Since the second monitor 16 will not be folded like the first monitor 12, the second monitor 16 is composed of a rigid liquid crystal monitor. The second monitor 16 need not be limited to a liquid crystal monitor, and may instead be a flexible display body such as an organic EL or an inorganic EL. In addition, the second monitor 16 may be a monitor with the small number of pixels to emphasize brightness so as to be visible even when used outdoors.

Meanwhile, a group of various operation buttons (operation devices) related to photographing are arranged at the right-side flat section 18 on the rear face of the camera main body 14, which is exposed when the second monitor 16 is opened. The group of various operation buttons comprises, from top to bottom: a zoom button 30, a playback button 32, a photo-mode button 34, a menu/OK button 36, a cross-shaped key 38 and the like. In addition, a photographing button 40 is positioned at a right corner of an upper face 15 of the camera main body 14.

The zoom button 30 is operated when adjusting focal length to a tele-side or a wide-side. The playback button 32 is operated when immediate playback of a photographed image is desired. Unlike the playback button operated during an image playback mode, the playback button 32 is a button operated during a photographing mode, and is operated when immediate verification of the photographic status of a photographed image of a subject is desired. In addition, the photo-mode button 34 is a button for switching between color photographing and black and white photographing. The menu/OK button 36 is an operation button which functions both as a menu button for issuing instructions to display a menu on the screen of the second monitor 16, and as an OK button for instructing finalization and execution or the like of selected contents. The cross-shaped key 38 is provided so as to be inclinable in the four directions of upward, downward, leftward and rightward, and is used as an operation key for selecting various setting items for setting the menu or the like, and for instructing changes to set contents and erasing stored images. The photographing button 40 is half-pressed and fully-pressed by the index finger of the right hand of the user which is gripping the right-side flat section 18 and the right-side section 19 of the rear face of the camera main body 14 as a grip section. Focus adjustment is performed during a half-pressed operation, while a subsequent fully-pressed operation causes a subject image to be formed on a color CCD 42 via the photographic lens unit 20 shown in FIG. 3.

As shown in FIG. 2, a power button 44 as well as an image button 46, a stop button 48, a fast forward button 50 and a rewind button 52 to be operated during image playback are respectively arranged in predetermined positions on the upper face 15 of the camera main body 14. While the image playback operation buttons 46, 48, 50 and 52 function during the image playback mode as function buttons related to image playback, the image playback operation buttons 46, 48, 50 and 52 may be assigned as other operation buttons related to photographing such as for increasing or reducing sensitivity by switching operation contents to different contents during the photographing mode.

In the digital camera 10 according to the present embodiment, when the folding section 22 is unfolded after turning on power, a switching device 54 shown in FIG. 3 detects such unfolding and a CPU 56 switches the mode of the camera to the image playback mode. In addition, when the folding section 22 is folded, a switching device 58 shown in FIG. 3 detects such folding and the CPU 56 switches the mode of the camera from the image playback mode to the photographing mode. Furthermore, when the first monitor 12 is closed in the state shown in FIG. 1 and the state changes to the state shown in FIG. 2, the switching device 58 may be arranged to detect the mode change. When the power has not been turned on, power may be turned on so that the CPU 56 automatically switches the camera mode to the photographing mode. Moreover, when power has been turned on before opening the folding section 22, the switching device 58 automatically switches the camera mode to the photographing mode. In any case, a state in which photographing is enabled may be realized by simple operations. The switching devices 54 and 58 are provided on a hinge shaft 24, and are exemplified by a switching device such as a leaf switch which is switched on/off according to the mode of the folding section 22.

Next, the block diagram shown in FIG. 3 will be described.

In the digital camera 10, when the switching device 54 detects that the first monitor 12 for image playback has been opened, the CPU 56 switches the mode of the camera to the image playback mode. In addition, when the switching device 58 detects that the second monitor 16 for photographing has been opened, the CPU 56 automatically switches the mode of the camera from the image playback mode to the photographing mode, and an input operation through the various operation buttons 30, 32, 34 and 38 will be enabled.

At the same time, transmission of playback images to the first monitor 12 will be suspended during the photographing mode, and a live view (subject image) will be displayed on the second monitor 16. In addition, operations related to playback through the various operation buttons 46, 48, 50 and 52 will be enabled during the image playback mode.

The CPU 56 integrally controls the entire operation of the digital camera 10. The CPU 56 functions both as a system control circuit section which controls the camera system according to a predetermined program, and as a computation device which executes various computations including automatic exposure (AE) computation, automatic focus adjustment (AF) computation, white balance (WB) adjustment computation and the like.

Programs executed by the CPU 56 and various data or the like necessary for control are stored in a ROM 62 connected to the CPU 56 via a bus 60. An EEPROM 64 stores CCD pixel defect information and various constants/information and the like regarding camera operation.

In addition, a memory (SDRAM) 66 is used both as a deployment area for programs and a computation work area of the CPU 56, and as a temporary storage area for image data and audio data. A storage section (HDD) 68 is a temporary storage memory used exclusively for storing image data, and is erasable through operations of the cross-shaped key 38 of the digital camera 10.

The photographing button 40 is an operation button for inputting instructions to commence photographing, and is configured as a two-stage stroke switch having a S1 switch which is activated upon half-pressing, and a S2 switch which is activated upon full-pressing.

While the first monitor 12 is driven as an image playback monitor and the second monitor 16 is driven as an electronic view finder, both monitors 12 and 16 are also used as user interface display screens for displaying, as needed, menu information and information such as selection items, setting contents or the like. In addition, image data stored in the storage section 68 is reduced to thumbnails to be displayed on both monitors 12 and 16.

The digital camera 10 is equipped with a media socket 70 to which a storage medium 72 is mounted. The format of the storage medium 72 is not particularly limited, and various media may be used, including semiconductor memory cards as typified by an xD-Picture Card™ or a SmartMedia™, a portable compact hard disk, a magnetic disk, an optical disk, a magneto-optic disk, and the like.

A media controller 74 performs required signal conversion in order to deliver and receive input/output signals suitable for the storage medium 72 mounted on the media socket 70.

In addition, the digital camera 10 comprises a USB interface section 76 as a communication device to provide connection to a personal computer and other external devices. Data such as image data may be received from and delivered to an external device by connecting the external device to a connector, which is a communication terminal, connected to the USB interface section 76 via a USB cable, not shown. It is obvious that communication systems are not limited to USB, and other communication systems may be applied.

Next, the photographing function of the digital camera 10 will be described.

When the second monitor 16 is opened and the mode is set to the photographing mode as shown in FIG. 2, power is supplied to an image capturing section which includes a color CCD 42, and a photographing-enabled state is established.

A photographic lens unit 20 is an optical unit which includes the photographic lens 78 and a diaphragm/mechanical shutter 80. The photographic lens unit 20 is electrically driven by a lens driving unit 82 and an aperture driving unit 84 which are controlled by the CPU 56, and performs zoom control, focus control and iris control.

Light passing through the photographic lens 78 focuses on an acceptance surface of the CCD 42. A large number of photodiodes (light receiving elements) are two-dimensionally arranged on the acceptance surface of the CCD 42, and red (R), green (G) and blue (B) primary color filters which respectively correspond to each photodiode are positioned in a predetermined array structure. In addition, the CCD 42 is equipped with an electronic shutter function which controls a charge accumulation time (shutter speed) of each photodiode. The CPU 56 controls the charge accumulation times at the CCD 42 through a timing generator 86. Image capturing elements of other systems such as a MOS-type image capturing element may be used instead of the CCD 42.

A subject image formed on the acceptance surface of the CCD 42 is converted by each photodiode into signal charges of a quantity corresponding to the amount of incident light. Signal charges accumulated in each photodiode are sequentially read out as voltage signals (image signals) corresponding to signal charges, based on a drive pulse applied by the timing generator 86 according to instructions from the CPU 56.

Signals outputted from the CCD 42 are sent to an analog processing unit (CDS/AMP) 88, where R, G, and B signals of each pixel receive sampling hold operations (correlated double sampling processing). The signals are then amplified and applied to an A/D converter 90. The dot-sequential R, G, and B signals converted into digital signals by the A/D converter 90 are stored in the memory 66 via an image input controller 92.

An image signal processing circuit 94 processes the R, G, and B signals stored in the memory 66 according to instructions from the CPU 56. More specifically, the image signal processing circuit 94 functions as an image processing device comprising a synchronization circuit (a processing circuit which interpolates spatial discrepancies in color signals due to the color filter array of a single plate CCD to convert color signals into synchronous signals), a white balance correction circuit, a gamma correction circuit, a contour correction circuit, a luminance/color difference signal generation circuit and the like, and performs predetermined signal processing according to commands from the CPU 56 while utilizing the memory 66.

The image signal processing circuit 94 converts RGB image data inputted thereto into luminance signals and color difference signals, and also performs predetermined processing such as gamma correction. Image data processed by the image signal processing circuit 94 is stored in the storage section 68.

When outputting photographed play-back images onto the first monitor 12, image data is read out from the storage section 68, and is sent to a video encoder 96 via the bus 60. The video encoder 96 converts the inputted image data into signals of a predetermined system for display (such as a NTSC system color complex picture signal) and outputs the same to the first monitor 12. In addition, live views during photographing are outputted from the picture signal processing circuit 94 via the bus 60 and the video encoder 96 to be displayed on the second monitor 16.

When the photographing button 40 is half-pressed and S1 is switched on, the digital camera 10 commences AE and AF processing. More specifically, image signals outputted from the CCD 42 are A/D converted, and inputted into an AF detection circuit 98 and an AE/AWB detection circuit 100 via the image input controller 92.

The AE/AWB detection circuit 100 includes a circuit which splits a single screen into a plurality of areas (for instance, 16 by 16) and respectively integrates RGB signals for each split area, and provides the integrated values to the CPU 56. The CPU 56 detects brightness of the subject (subject luminance) based on the integrated values inputted from the AE/AWB detection circuit 100, and calculates an exposure value (photographing EV value) suitable for photographing. An aperture value and a shutter speed are determined according to the obtained exposure value and a predetermined program diagram. According to the determined aperture value and shutter speed, the CPU 56 controls an electronic shutter and an iris of the CCD 42 to obtain an appropriate exposure.

Additionally, during automatic white balance adjustment, the AE/AWB detection circuit 100 respectively calculates an average integrated value for each color of RGB signals for each split area, and provides the calculation results to the CPU 56. Once an R integrated value, a B integrated value, and a G integrated value are obtained, the CPU 56 calculates R/G and B/G ratios for each split area, performs discrimination of light source type based on distribution of the R/G and B/G values across R/G and B/G color spaces and the like, controls gain values (white balance correction values) of the white balance adjustment circuit against the R, G, and B signals based on white balance adjustment values appropriate for the discriminated light source types so that the value of each ratio is, for instance, approximately 1, and corrects signals of the respective color channels. Images which retain a certain color may be generated by adjusting the gain values of the white balance adjustment circuit so that the above-mentioned ratios assume values other than 1.

A contrast AF which moves a focusing lens (among the lens optical system comprising the photographic lens 78, a movable lens which contributes to focus adjustment) so that, for instance, a high frequency component of the G signal of the picture signal is maximum), is used as the AF control in the digital camera 10. More specifically, the AF detection circuit 98 is comprised of a bypass filter which allows passage of only high frequency components of the G signal, an absolute valuation processing section, an AF area extraction section which cuts out signals within a focus object area which is preset in the screen (for instance, at a central portion of a screen), and an integration section which integrates absolute value data within the AF area.

Data of integrated values obtained by the AF detection circuit 98 is notified to the CPU 56. The CPU 56 computes focus evaluated values (AF evaluated values) at a plurality of AF detection points while moving the focusing lens by controlling the lens driving section 82, and determines a lens position at which the evaluated value is maximum as a focal point. The CPU 56 then controls the lens driving section 82 so as to move the focusing lens to the obtained focal position. Calculation of AF evaluated values is not limited to a mode in which G signals are used, and luminance signals (Y signals) may be used instead.

The photographing button 40 is half-pressed to turn on S1 to perform AE/AF processing, and the photographing button 40 is full-pressed to turn on S2 to initiate photographing operations for recording. Image data obtained in response to the activation of S2 is converted into a luminance/color difference signal (Y/C signal) at the image signal processing circuit 94, and is stored in the memory 66 after receiving predetermined processing such as gamma correction and the like.

Y/C signals stored in the memory 66 are compressed according to a predetermined format at a compression/expansion circuit 102, and stored in the storage medium 72 via the media controller 74. For instance, still images are stored in JPEG format.

Next, when the first monitor 12 is unfolded as shown in FIG. 1 to switch the mode to the image playback mode, and the playback button 46 is subsequently operated, compressed data of the last image file (the file last recorded) stored in the storage section 68 or the storage medium 72 is read out. If the last recorded file is a still image file, the read-out image compressed data is expanded into a non-compressed YC signal via the compression/expansion circuit 102, converted into a display signal via the image signal processing circuit 94 and the video encoder 96, and then outputted to the first monitor 12. Image contents of the file are hereby displayed on the screen of the first monitor 12.

During frame-by-frame playback of still images (as well as during playback of lead frames of moving images), a playback object image may be switched to a next image file (frame advance/frame reverse) by operating the fast forward button 50 and the rewind button 52 shown in FIG. 1. An image file of a frame-advanced position is read out from the storage section 68 and the storage medium 72, and a still image or a moving image is playback-displayed on the first monitor 12 in the same manner as described above.

Next, advantages of the digital camera 10 configured as described above will be explained.

First, when using the digital camera 10 as an image playback device, the first monitor 12 is first opened as shown in FIG. 1 and power is turned on. This automatically switches the mode of the digital camera 10 to the image playback mode. Subsequently, by operating image playback operation members such as the playback button 46, images stored in the memory 66, the storage section 68 or the storage medium 72 are sequentially read out and displayed on the first monitor 12.

Next, when performing photographing using the digital camera 10, the second monitor 16 is opened as shown in FIG. 2 to set the camera to the photographing mode. Photographing is performed by operating ad libitum the photographing operation buttons 30, 32, 34, 36 and 38 which have been exposed by opening the second monitor 16 and by operating the photographing button 40, while studying the live view displayed on the second monitor 16.

As seen, with the digital camera 10 according to the present embodiment, enlargement of the screen during image playback may be achieved by configuring the first monitor 12 to be roughly the same size as the rear face of the camera main body 14, and improvement of gripability during photographing may be achieved by configuring the second monitor 16 to be smaller (approximately half) than the first monitor 12 to enable the portion 18 of the camera main body 14 that is located to the side of the second monitor 16 to be used as a grip section.

In addition, by providing the photographing operation buttons 30, 32, 34, 36 and 38 related to photographing at the portion 18 of the camera main body 14 which is located to the side of the second monitor 16, improvement of operability of the digital camera 10 during photographing is achieved.

Furthermore, while the digital camera 10 may be carried either in a state in which the first monitor 12 is opened or in a state in which the second monitor 16 is opened, since the size of the digital camera 10 at this point will not become larger than the camera main body 14, portability is improved in comparison to a camera in which a grip section is separately formed on the camera main body 14.

Moreover, since the photographing operation buttons 30, 32, 34, 36 and 38 which are exposed during the photographing mode will be hidden by the second monitor 16 during the image playback mode as shown in FIG. 2, risks of erroneous operations may be eliminated and improvement of operability is achieved.

Figure 4:
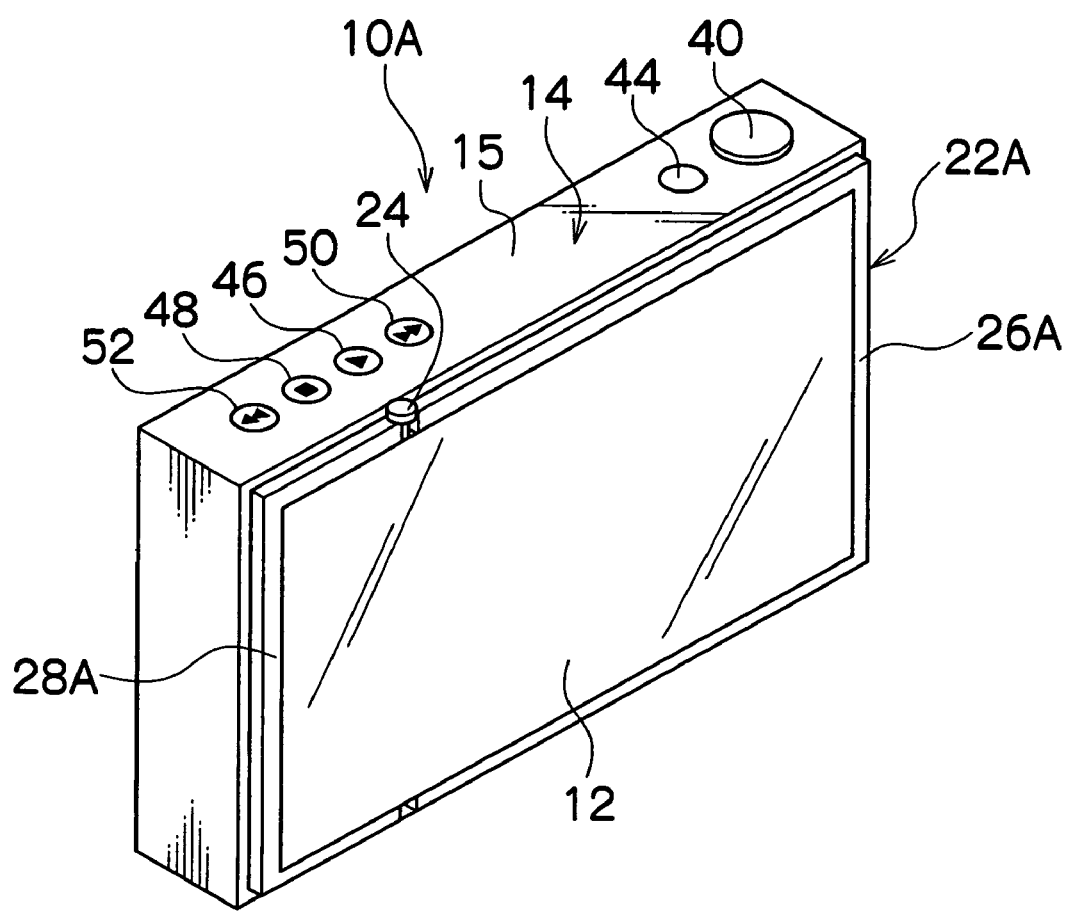
FIG. 4 is a rear perspective view of a digital camera according to a second embodiment during an image playback mode.
Figure 5:
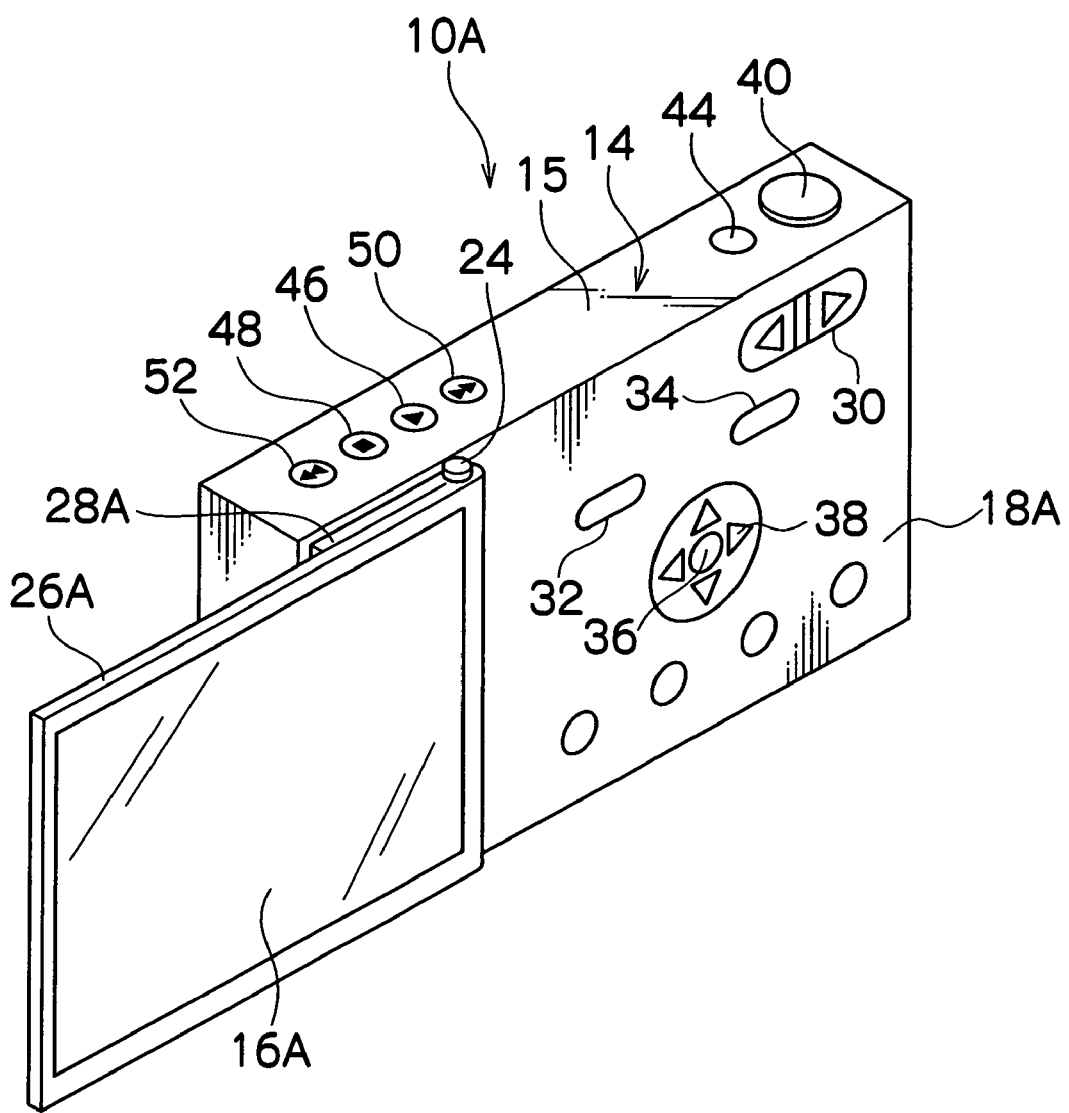
FIG. 5 is a rear perspective view of the digital camera according to the second embodiment during a photographing mode.

FIG. 4 is a rear perspective view of a camera main body 14 in a state in which a first monitor 12 is opened, in a digital camera 10A according to a second embodiment. In addition, FIG. 5 is a rear perspective view of the camera main body 14 in a state in which the first monitor 12 is closed and a second monitor 16A is opened. Same or similar parts to those used in the digital camera 10 according to the first embodiment shown in FIGS. 1 to 3 are assigned same reference numerals, and descriptions thereof will be omitted.

The digital camera 10A shown in FIG. 4 is arranged so that a hinge shaft 24 of a folding section 22A is displaced leftwards in FIG. 4 in order to provide a larger screen for the second monitor 16A to be used during photographing. As a result, since a C-shaped frame 26A of the folding section 22A to which the second monitor 16A is to be fixed becomes larger than the C-shaped frame 26 shown in FIG. 1, the second monitor 16A with a screen larger than the second monitor 16 may be used.

The first monitor 12 to be fixed to the folding section 22A has the same configuration as the first monitor 12 shown in FIG. 1. In addition, the folding section 22A is attached to the camera main body 14 by fixing a C-shaped frame 28A to the camera main body 14.

In the first and second embodiments, while the first monitor 12 and the second monitors 16 and 16A have been configured to be openable and closeable in relation to the camera main body 14 by providing the first monitor 12 and the second monitors 16 and 16A on the folding sections 22 and 22A, the first monitor 12 and the second monitors 16 and 16A may be configured to be openable and closeable in relation to the camera main body 14 without providing the folding sections 22 and 22A. In this case, the second monitors 16 and 16A should be configured to be closed when the first monitor 12 is opened, and the first monitor 12 should be configured to be closed when the second monitors 16 and 16A are opened.

What is claimed is:

1. A camera, comprising:
   a camera main body;
   a first monitor which is openable and closable on the camera main body; and
   a second monitor which is openable and closable on a rear face side of the first monitor;
   wherein the first monitor and the second monitor are configured so that the second monitor is closed when the first monitor is opened, and the first monitor is closed when the second monitor is opened,
   wherein the first monitor is configured to be substantially the same size as a rear face of the camera main body when the first monitor is opened, and the second monitor is configured to be smaller than the first monitor, and
   wherein the first monitor is a flexible display body and the first monitor is configured so that the first monitor is closed due to a portion of the first monitor being folded when the second monitor is opened and wherein operation devices related to photographing are provided at a portion of the camera main body which is exposed when the second monitor is unfolded.

2. The camera according to claim 1, wherein the first monitor is an image playback monitor, while the second monitor is a finder monitor.

3. The camera according to claim 1, wherein
   the camera mode is switched to an image playback mode when the first monitor is unfolded and image playback is performed on the first monitor, and
   the camera mode is switched to a photographing mode when the second monitor is folded and a subject image is displayed on the second monitor.

4. The camera according to claim 2, wherein
   the camera mode is switched to an image playback mode when the first monitor is unfolded and image playback is performed on the first monitor, and
   the camera mode is switched to a photographing mode when the second monitor is folded and a subject image is displayed on the second monitor.

* * * * *